(12) United States Patent
Verma

(10) Patent No.: US 12,151,870 B2
(45) Date of Patent: Nov. 26, 2024

(54) SMART INFUSION WATER BOTTLE

(71) Applicant: Kumud Verma, Revere, MA (US)

(72) Inventor: Kumud Verma, Revere, MA (US)

( * ) Notice: Subject to any disclaimer, the term of this patent is extended or adjusted under 35 U.S.C. 154(b) by 117 days.

(21) Appl. No.: 18/092,365

(22) Filed: Jan. 2, 2023

(65) Prior Publication Data

US 2024/0217719 A1     Jul. 4, 2024

(51) Int. Cl.
| | |
|---|---|
| *B65D 81/32* | (2006.01) |
| *A47J 31/00* | (2006.01) |
| *A47J 31/52* | (2006.01) |
| *A47J 41/00* | (2006.01) |
| *B65D 43/02* | (2006.01) |
| *B65D 51/24* | (2006.01) |

(52) U.S. Cl.
CPC ........ *B65D 81/3205* (2013.01); *A47J 31/005* (2013.01); *A47J 31/5253* (2018.08); *A47J 41/0072* (2013.01); *B65D 43/0231* (2013.01); *B65D 51/245* (2013.01); *A47J 2202/00* (2013.01)

(58) Field of Classification Search
CPC .. A47J 31/5253; A47J 31/005; A47J 41/0072; B65D 43/0231; B65D 51/245
See application file for complete search history.

(56) References Cited

U.S. PATENT DOCUMENTS

| | | | | |
|---|---|---|---|---|
| 4,290,537 A * | 9/1981 | Chi-Jung | ............... | G01K 13/00 222/25 |
| 6,915,733 B1 * | 7/2005 | Langbauer | .............. | A47J 31/20 426/433 |
| 7,798,373 B1 * | 9/2010 | Wroblewski | ........ | B05B 11/0097 222/401 |
| 8,387,517 B2 * | 3/2013 | Geissler | ................... | A47J 31/56 99/283 |
| 8,584,576 B2 * | 11/2013 | Fogg, IV | ............. | A47J 36/2466 99/320 |
| 8,967,038 B2 * | 3/2015 | Rivera | ............... | B65D 85/8061 99/295 |
| 9,743,797 B2 * | 8/2017 | Richardson | .......... | A47J 31/5253 |
| 10,405,688 B2 * | 9/2019 | Lin | ........................ | A47G 19/22 |
| 10,441,105 B1 * | 10/2019 | Fogg, IV | .............. | A47J 31/005 |
| 11,154,156 B2 * | 10/2021 | Redington | ............ | A47J 31/005 |
| 11,553,813 B2 * | 1/2023 | Eisenberg | ........... | A47J 31/0626 |

(Continued)

*Primary Examiner* — Hoi C Lau

(57) ABSTRACT

A smart infusion water bottle is disclosed. The infusion water bottle comprising a body comprising an open end at a top portion for allowing a liquid to flow in and out therethrough and an infusion chamber configured to be removably secured to the top portion of the body, and receive a flavoring material, wherein the infusion chamber comprises a plurality of openings at a bottom portion of the infusion chamber, to allow the liquid to flow in and out of the infusion chamber. The infusion water bottle further comprises a lid removably secured to a top portion of the infusion chamber, wherein the lid comprises a temperature sensor coupled to the infusion chamber and downwardly extending therefrom to the body, a display positioned on a surface of the lid and a controller operatively connected to the temperature sensor and the display, wherein the controller is configured to receive signals from the temperature sensor indicative of the temperature inside the infusion chamber and the body, and output temperature information on the display.

22 Claims, 14 Drawing Sheets

(56) References Cited

U.S. PATENT DOCUMENTS

| | | | |
|---|---|---|---|
| 2002/0145527 A1* | 10/2002 | Lassota | A47J 31/50 340/622 |
| 2009/0020018 A1* | 1/2009 | Melzer | A47J 31/20 99/288 |
| 2009/0178569 A1* | 7/2009 | Tucker | A47J 31/18 99/284 |
| 2011/0072979 A1* | 3/2011 | Fogg, IV | A47J 36/2466 99/302 R |
| 2011/0250332 A1* | 10/2011 | Geissler | A47J 31/20 99/322 |
| 2012/0000918 A1* | 1/2012 | Deane | B65D 81/3834 220/592.2 |
| 2012/0321756 A1* | 12/2012 | Estabrook | B65D 81/3205 426/115 |
| 2013/0118358 A1* | 5/2013 | Lown | A47J 31/20 99/279 |
| 2015/0122688 A1* | 5/2015 | Dias | A47G 19/027 206/459.1 |
| 2016/0135639 A1* | 5/2016 | Sacks | A47J 31/0621 99/323 |
| 2016/0255986 A1* | 9/2016 | Smaldone | A47J 31/20 |
| 2016/0296058 A1* | 10/2016 | Hauser | A47G 19/16 |
| 2016/0360918 A1* | 12/2016 | Chen | A23F 3/18 |
| 2017/0035238 A1* | 2/2017 | Hambly | A47J 31/4403 |
| 2017/0119196 A1* | 5/2017 | Chen | A47J 31/0605 |
| 2017/0305731 A1* | 10/2017 | Kyle | B67D 1/08 |
| 2018/0273260 A1* | 9/2018 | Lin | A47J 31/0636 |
| 2019/0110627 A1* | 4/2019 | Biesinger | A23L 2/04 |
| 2019/0200800 A1* | 7/2019 | Redington | A47J 31/005 |
| 2020/0008605 A1* | 1/2020 | Maloni | A47J 31/4403 |
| 2020/0085228 A1* | 3/2020 | Williamson | A47G 19/16 |
| 2020/0093313 A1* | 3/2020 | Larsen | A47J 31/18 |
| 2020/0121115 A1* | 4/2020 | Oh | A47J 31/46 |
| 2020/0315391 A1* | 10/2020 | Patel | A47J 31/20 |
| 2021/0127890 A1* | 5/2021 | Baston | A47J 41/022 |
| 2021/0137306 A1* | 5/2021 | Rivera | A47J 31/5255 |
| 2021/0212485 A1* | 7/2021 | Attar | A47G 19/2227 |
| 2021/0235918 A1* | 8/2021 | Chen | A23F 5/26 |
| 2022/0061579 A1* | 3/2022 | Rivera | A47J 31/20 |
| 2022/0151439 A1* | 5/2022 | Fantappie | A47J 41/0072 |
| 2023/0010774 A1* | 1/2023 | Stubrin | A47J 31/06 |
| 2023/0309583 A1* | 10/2023 | Haywood | B65D 47/0828 220/705 |
| 2023/0397761 A1* | 12/2023 | Rose | A47G 19/2272 |

* cited by examiner

SMART INFUSION WATER BOTTLE

BACKGROUND OF THE INVENTION

Technical Field

The present disclosure primarily relates to a smart infusion water bottle and in particular relates to a smart infusion water bottle for making infused beverages while maintaining the temperature of beverages via vacuum as in thermos flask and allowing an individual to maintain hydration levels, thereby assisting individuals in maintaining a healthy lifestyle. The top of the lid has a touch screen temperature display which is powered by replaceable Lithium-Ion battery.

Description of the Related Art

A healthy lifestyle is a way of living that an individual maintains to lower the risk of diseases, stay fit, and increase or maintain immunity towards infections such as COVID 19 and Flu. World Health Organization (WHO) defines health as "a complete state of mental, physical, and social well-being not merely the absence of disease". Individuals could maintain a healthy lifestyle by:
  i) eating a balanced diet and limiting unhealthy foods, exercising regularly, and opting for nutritious meals high in protein and fiber, and low in fat, sugar, and calories;
  ii) taking multivitamin supplements if the requisite amount of nutrients is not available through a natural diet and ensuring that the body is not deficient in vitamins such as A, B6, B12, C, D, and E, and micronutrients such as zinc, iron, copper, selenium, and magnesium; and
  iii) drinking water for staying hydrated and limiting sugar beverages.

Over the past few years, rapid expansion in several relevant scientific fields and, in particular, the number of population-based epidemiological evidence has helped to clarify the role of diet in preventing and controlling morbidity, and premature mortality resulting from non-communicable diseases (NCDs). Some of the specific dietary components increase the probability of occurrence of these diseases in individuals, and interventions to modify their impact, have also been identified.

Human body has evolved to adapt to a certain kind of environment, and it stands to reason that human health is inextricably linked to its surrounding environment. Furthermore, rapid changes in diet and lifestyles have occurred with industrialization, urbanization, economic developments, and market globalization. However, our understanding of the environmental effects on health is still an area of study. All that is having a significant impact on the health and nutrition of the population, particularly in developing countries and in countries in transition. While standards of living have improved, food availability has expanded and become more diversified, and access to services has increased, there have also been significant negative consequences in terms of inappropriate dietary patterns, decreased physical activities and increased tobacco use, and a corresponding increase in diet-related chronic diseases, especially among poor people.

Food and food products have become commodities produced and traded in a market that has expanded from an essentially local base to an increasingly global one. Changes in the world food economy are reflected in shifting dietary patterns, for example, increased consumption of energy-dense diets high in fat, particularly saturated fat, and low in unrefined carbohydrates. These patterns are combined with a decline in energy expenditure that is associated with a sedentary lifestyle, motorized transport, labor-saving devices in the home, phasing out of physically demanding manual tasks in the workplace, and leisure time that is preponderantly devoted to physically undemanding pastimes.

Because of these changes in dietary and lifestyle patterns, chronic NCDs and diseases including obesity, diabetes, cardiovascular disease (CVD), hypertension and stroke, and cancer are becoming increasingly significant causes of disability and premature death in both developing and newly developed countries, placing additional responsibility on national health resources.

Despite being one of the most pervasive materials on the planet, plastic and its impact on human health are still under study. Yet exposure to plastic is expanding into new areas of the environment and food chain as existing plastic products (for example, plastic containers and water bottles) fragment into smaller particles and concentrate toxic chemicals. Ordinarily, plastic products are manufactured using industrial chemicals, for example, bisphenol A (BPA), which is majorly used in the manufacture of polycarbonate and epoxy resins. Currently, bisphenol F (BPF) and bisphenol S (BPS) are replacing bisphenol A (BPA) in the manufacturing of such products. Data on current human exposure levels of these substitutes is required to understand the negative impact on human health and risks posed.

Although BPS has been a favored replacement for BPA because it was believed to be more resistant to leaching, due to lack of substantial toxicological data in support of use of bisphenol S, it has not been able to successfully replace bisphenol A. In the absence of safer alternatives to bisphenol A, a polymer resin material, Tritan®, a product from Eastman Chemical Company, which is a BPA-free plastic is being considered as an alternative to polycarbonates as a food-grade material.

However, polymer resin material, Tritan®, does not offer temperature control properties when an individual is interested in drinking hot beverages such as infused green tea and would like to maintain that temperature for four hours.

In the current times, individuals generally are relying more on artificial and intoxicated methods for fulfilling their nutrient requirements. Approximately 70% of human body is water, it plays a crucial role in sustaining human life and life on earth. Whilst infused water has been used in certain civilizations for health and wellness. The modern industry is losing touch with natural ways of maintaining health, youth, longevity and immunity.

Therefore, there has been a long-standing requirement for designing an infusion bottle to prepare infused beverages and allowing an individual not only to maintain hydration levels but also to infuse natural nutrients at the same time.

SUMMARY OF THE INVENTION

The present disclosure envisages a smart infusion water bottle that mitigates the drawbacks of the state-of-the-art. Accordingly, we propose a smart infusion water bottle constructed of stainless steel and borosilicate glass that is double walled to create vacuum as in a thermos flask. Whilst stainless steel offers a strong material, borosilicate glass offers transparency to visually observe the concentration level.

An object of the present disclosure is to provide a smart infusion water bottle for brewing infused beverages.

Another object of the present disclosure is to provide the infusion water bottle configured to allow a user to monitor and control the temperature of liquid stored inside the infusion water bottle.

In a first aspect, embodiments of the present disclosure provide a smart infusion water bottle comprising a body, an infusion chamber and a lid. The body comprises an open end at a top portion for allowing a liquid to flow in and out therethrough. The infusion chamber configured to be removably secured to the top portion of the body, receives a flavoring material, wherein the infusion chamber comprises a plurality of openings at a bottom portion of the infusion chamber, to allow the liquid to flow in and out of the infusion chamber. The infusion water bottle further comprises a lid removably secured to a top portion of the infusion chamber, wherein the lid comprises a temperature sensor coupled to the infusion chamber and downwardly extending therefrom to the body, a display positioned on a surface of the lid and a controller operatively connected to the temperature sensor and the display, wherein the controller is configured to receive signals from the temperature sensor indicative of the temperature inside the infusion chamber and the body and output temperature information on the display.

In an embodiment, the infusion water bottle is configured to enable an individual or a user for brewing infused beverages or flavored liquids for consumption. The temperature of the liquid inside the infusion water bottle is measured and displayed over the display. The infusion water bottle is an environmentally friendly container for liquids that is designed to brew infused beverages and, upon disassembly, may easily be separated for cleaning with minimal effort. The infusion water bottle is configured to be a container, such as, but not limited to, a pitcher, a jug, and a cup. In one embodiment, the infusion water bottle is made of a material, but not limited to, a Borosilicate glass. In an alternative embodiment of the present invention, the infusion water bottle is made of a material comprising at least one of Borosilicate glass and stainless steel.

In a second aspect, embodiments of the present disclosure provide a smart infusion water bottle comprising a body, an infusion chamber and a lid. The body comprises an open end at a top portion for allowing a liquid to flow in and out therethrough. The infusion chamber configured to be removably secured to the top portion of the body, receives a flavoring material, wherein the infusion chamber comprises a plate secured to a bottom portion of the infusion chamber, is configured to be extended towards an outer periphery of the infusion chamber, wherein the plate comprises a plurality of openings to allow the liquid to flow in and out of the infusion chamber. The infusion water bottle further comprises a lid removably secured to a top portion of the infusion chamber, wherein the lid comprises a temperature sensor coupled to the infusion chamber and downwardly extending therefrom to the body, a display positioned on a surface of the lid and a controller operatively connected to the temperature sensor and the display, wherein the controller is configured to receive signals from the temperature sensor indicative of the temperature inside the infusion chamber and the body and output temperature information on the display.

In a third aspect, embodiments of the present disclosure provide a smart infusion water bottle comprising a body, an infusion chamber and a lid. The body comprises an open end at a top portion for allowing a liquid to flow in and out therethrough. The infusion chamber configured to be removably secured to the top portion of the body, receives a flavoring material, wherein the infusion chamber comprises a plurality of openings at a bottom portion of the infusion chamber, to allow the liquid to flow in and out of the infusion chamber. The infusion water bottle further comprises a lid removably secured to a top portion of the infusion chamber, wherein the lid comprises a temperature sensor coupled to the infusion chamber and downwardly extending therefrom to the body and a display positioned on a surface of the lid, wherein the display indicates output information indicative of the temperature inside the infusion chamber and the body over the screen thereof.

In one embodiment, the infusion water bottle is configured to receive a flavoring material, thereby infusing flavors from the flavoring material into the liquid stored in the infusion water bottle. In one embodiment, the flavoring material comprises at least one additive selected from the group including natural flavors, nature-identical flavors, and artificial flavors. In another embodiment, the flavoring material comprises at least one additive selected from the group including pieces of fruits and vegetables. Particularly preferred flavors include citrus flavors such as, but not limited to, orange flavor, lemon flavor, lime flavor, and grapefruit flavor. In addition to such citrus flavors, various other flavors such as green tea, chamomile tea, apple, grape, raspberry, cranberry, cherry, and pineapple flavors are also usable.

In an embodiment, the infusion chamber comprises a plurality of threads at the top portion thereof, annularly formed around an opening top of the infusion chamber for threadably engaging to an outer surface of a bottom portion of the lid. In another embodiment, the infusion chamber comprises a plurality of threads at the bottom portion thereof, annularly formed around an opening bottom of the infusion chamber, for threadably engaging to an outer surface of the top portion of the body.

In some embodiments, the infusion chamber comprises a locking groove annularly formed around the opening top and the opening bottom thereof for securing to the bottom portion of the body of the infusion water bottle.

In an embodiment, the infusion chamber comprises a flange removably secured to a bottom portion of the infusion chamber and a plate extending towards an outer periphery of the flange, wherein the plate comprises the plurality of openings to allow the liquid to flow in and out of the infusion chamber. In another embodiment, the flange is removably secured to an inner surface of the bottom portion of the infusion chamber, thereby securing the flange to the bottom portion of the infusion chamber.

In an embodiment, the body and the infusion chamber of the infusion water bottle is made of a double-walled steel enclosing a vacuum therebetween. In another embodiment, the infusion water bottle is made of a material, but not limited to, a Borosilicate glass. In an alternative embodiment of the present invention, the infusion water bottle is made of a material comprising at least one of Borosilicate glass and stainless steel.

In an embodiment, the flavoring material comprises at least one additive selected from the group including natural flavors, nature-identical flavors, artificial flavors, and pieces of fruits and vegetables.

In yet another embodiment, the lid comprises one or more battery cells disposed therein, wherein the one or more battery cells are operatively connected to the temperature sensor and the display, thereby providing required operating energy to the temperature sensor and the display.

Embodiments of the present disclosure substantially eliminate or at least partially address the aforementioned problems in the prior art and enables the aforesaid system for performing legal background checks without involving any mediator or third person in a reliable, efficient and real time manner. Furthermore, the system provides transparency related to process of legal background check.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

Embodiments of the present disclosure will now be described, by way of example only, with reference to the following diagrams wherein.

DETAILED DESCRIPTION OF THE EMBODIMENTS

Figure 1:
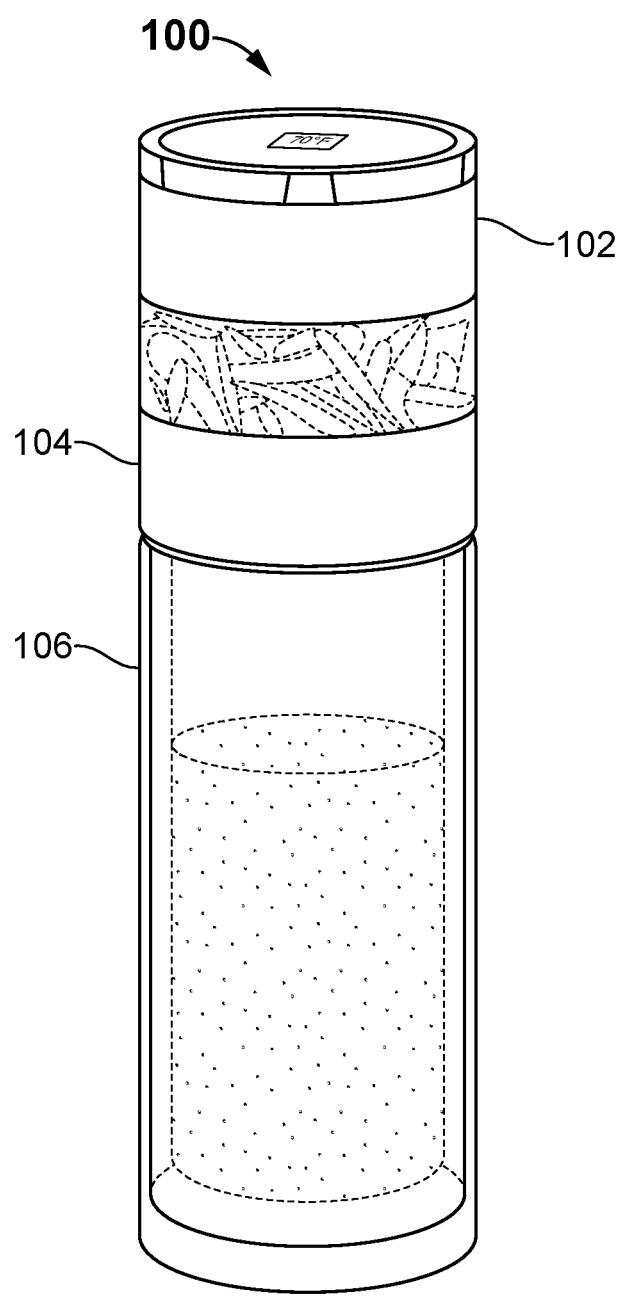
FIG. 1 illustrates a top perspective view of a smart infusion water bottle, according to one embodiment of the present disclosure.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in the given specification. It will be appreciated that in the development of any such actual implementation (as in any development project), design decisions must be made to achieve the designers' specific goals (e.g., compliance with system- and business-related constraints), and that these goals will vary from one implementation to another.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Referring to FIG. 1, there is provided a smart infusion water bottle 100, according to one embodiment of the present disclosure. According to an embodiment, the infusion water bottle comprises a body 124, an infusion chamber 102, and a lid 104. The body 124 comprises an open end at a top portion for allowing a liquid to flow in and out therethrough. The infusion chamber 102 is configured to be removably secured to the top portion of the body 124, thereby sealing the open end of the body 124 of the infusion water bottle 100. Further, the infusion chamber 102 receives a flavoring material, wherein the infusion chamber 102 comprises a plurality of openings at a bottom portion of the infusion chamber 102, to allow the liquid to flow in and out of the infusion chamber 102. In another embodiment, the infusion chamber 102 and the body are separated via a plate provided at the bottom portion of the infusion chamber 102, wherein the infusion chamber 102 is configured to receive the flavoring material that gets infused with the liquid inside the body. Consequently, the flavors from the flavoring material are infused into the liquid stored in the infusion water bottle 100.

The infusion water bottle further comprises a lid 104 removably secured to a top portion of the infusion chamber 102, wherein the lid 104 comprises a temperature sensor, a display, and a controller. In an embodiment, the temperature sensor is coupled to the infusion chamber 102 and downwardly extending therefrom to the body 124. In another embodiment, the display is positioned on a surface 118 of the lid 104. In yet another embodiment, the controller is operatively connected to the temperature sensor and the display, wherein the controller is configured to receive signals from the temperature sensor indicative of the temperature inside the infusion chamber 102 and the body 124, and thereby output temperature information on the display. Typically, the display is provided at a top surface 118 of the lid 104 in order to easily monitor the temperature readings of the liquid stored inside the infusion water bottle. In another embodiment, the display comprising a touch-screen display, is activated upon the physical contact of user 126 with the display. The touch screen display is activated once the user 126 touches the display and output the temperature information of the liquid stored inside the infusion water bottle over the display.

In an embodiment, the infusion chamber 102 is configured to receive a flavoring material, wherein the flavoring material includes the nutrients required by the user 126. In an example, when the user 126 tilts the infusion water bottle to a certain extent, the liquid such as water, is forced to be moved under the action of gravity, inside the infusion chamber 102 and gets infused with the flavoring material. The degree of infusion of flavoring material with the liquid may be varied by varying the amount of time in which the infusion water bottle 100 is kept in the tilted position.

The infusion water bottle 100 as disclosed herein, assists the user 126 to stay hydrated while maintaining a healthy lifestyle. Furthermore, the temperature of the liquid such as brewed beverage or water can easily be controlled or monitored via the display and temperature sensors provided at the lid 104 of the infusion water bottle 100. In some instances, a user 126 has to prefer water or brewed beverage heated at a particular temperature only. In such instances, the disclosed infusion water bottle 100 comes out to be significantly helpful for the user 126 as the user 126 can easily monitor the temperature of the brewed beverage stored inside the infusion water bottle 100. Since the infusion water bottle 100 is portable and easy to carry, it allows the user 126 to stay hydrated at all the time. It is a more holistic and natural approach to increasing immunity, weight management, and achieving better skin, hair, and nails for the user 126. The infusion water bottle 100 is a more sophisticated approach to provide the modern-day lifestyle for the user 126.

In one embodiment, the infusion water bottle 100 is configured to enable an individual or a user 126 for brewing infused beverages or flavored liquids for consumption. In another embodiment, the infusion water bottle is configured to provide the user 126 with the measurements of temperature of the brewed infused beverage. In yet another embodiment, the infusion water is configured to provide the user 126 with the measurements of temperature of liquid such as water, stored therein. The infusion water bottle 100 is an environmentally friendly container for liquids that is designed to brew infused beverages and, upon disassembly, may easily be separated for cleaning with minimal effort. The infusion water bottle 100 could be a container, such as, but not limited to, a pitcher, a jug, and a cup. In one embodiment, the infusion water bottle 100 is made of a material, but not limited to, a Borosilicate glass.

Figure 2:
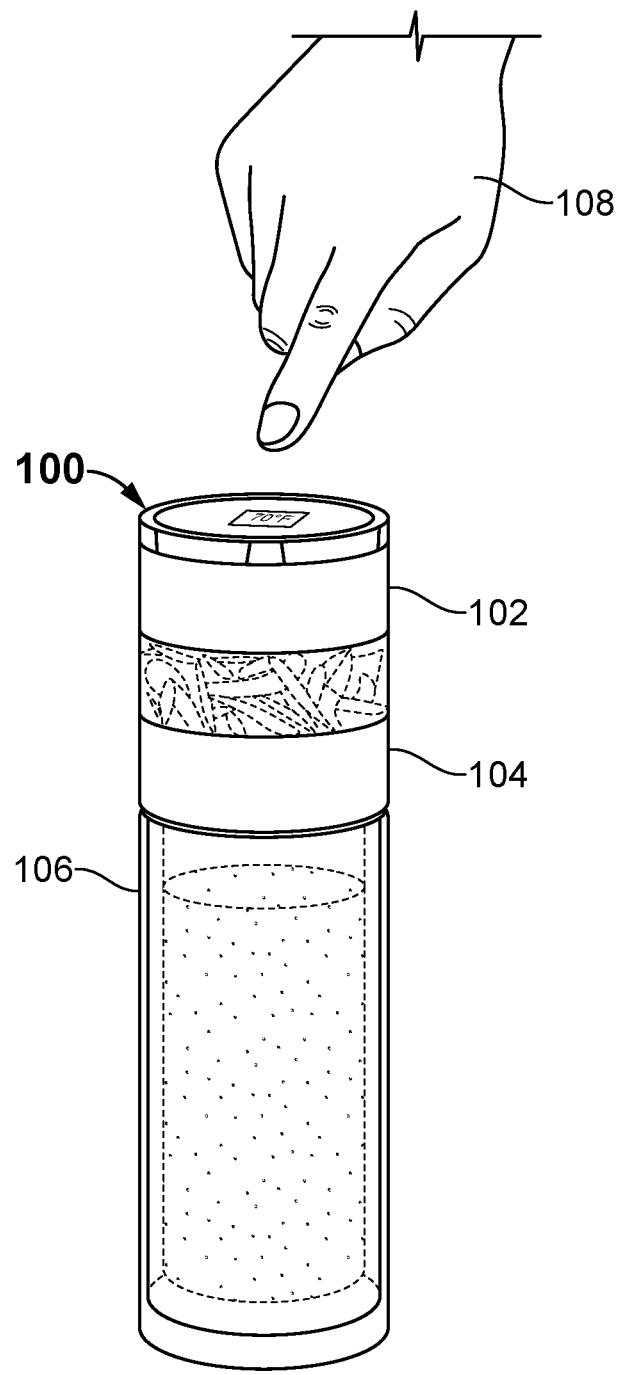
FIG. 2 illustrates a smart infusion water bottle, according to another embodiment of the present disclosure.

Referring to FIG. 2, there is provided an illustration of the infusion water bottle 100, in accordance with an embodiment of the present disclosure. According to an embodiment, the infusion water bottle comprises a body 124, an infusion chamber 102 and a lid 104. In accordance with an embodiment of the present disclosure, the body 124 of the infusion water bottle 100 is selected from the group comprising at least one of, but not limited transparent liquid container made of a Borosilicate glass. Furthermore, the infusion chamber 102 of the infusion water bottle 100 is selected from the group comprising, but not limited to transparent liquid container made of a Borosilicate glass. The body 124 comprises an open end at a top portion for allowing a liquid to flow in and out therethrough. The infusion chamber 102 configured to be removably secured to the top portion of the body, thereby sealing the open end of the body 124 of the infusion water bottle 100. Further, the infusion chamber 102 receives a flavoring material, wherein the infusion chamber 102 comprises a plurality of openings at a bottom portion of the infusion chamber 102, to allow the liquid to flow in and out of the infusion chamber. Consequently, the flavors from the flavoring material are infused into the liquid stored inside the infusion water bottle 100. In an example, when the user 126 tilts the infusion water bottle to a certain extent, the liquid such as water, is forced to be moved under the action of gravity, inside the infusion chamber 102 and gets infused with the flavoring material. In an embodiment, the infusion chamber 102 comprises a flange removably secured to a bottom portion of the infusion chamber 102 and a plate extending towards an outer periphery of the flange, wherein the plate comprises the plurality of openings to allow the liquid to flow in and out of the infusion chamber. In another embodiment, the flange is removably secured to an inner surface of the bottom portion of the infusion chamber 102, thereby, securing the flange to the bottom portion of the infusion chamber 102.

The infusion water bottle 100 further comprises a lid 104 removably secured to a top portion of the infusion chamber 102, wherein the lid comprises a temperature sensor, a display and a controller. In an embodiment, the temperature sensor is coupled to the infusion chamber 102 and downwardly extending therefrom to the body. In another embodiment, the display is positioned on a surface 118 of the lid. In yet another embodiment, the controller is operatively connected to the temperature sensor and the display, wherein the controller is configured to receive signals from the temperature sensor indicative of the temperature inside the infusion chamber 102 and the body 124, and output temperature information on the display. Typically, the display is provided at a top surface 118 of the lid 104 in order to monitor the temperature readings of the liquid stored inside the infusion water bottle 100.

The infusion water bottle 100 is configured to be designed with an environment-conscious approach. The infusion water bottle 100 as disclosed herein, is recyclable, sustainable, and reusable, thereby reduce carbon footprint and help in environmental protection.

In accordance with the embodiments as described above, the infusion chamber 102 is configured to receive a flavoring material, thereby infusing flavors from the flavoring material into the liquid stored in the infusion water bottle 100. In one embodiment, the flavoring material comprises at least one additive selected from the group including natural flavors, nature-identical flavors, and artificial flavors. In another embodiment, the flavoring material comprises at least one additive selected from the group including pieces of fruits and vegetables. Particularly preferred flavors include citrus flavors such as, but not limited to, orange flavor, lemon flavor, lime flavor, and grapefruit flavor. In addition to such citrus flavors, various other flavors such as green tea, apple, grape, raspberry, cranberry, cherry, and pineapple flavors are also usable. The infused flavored water based on the choice of ingredient can be used for weight loss, weight management, detox, better skin and longevity.

In one embodiment, the infusion water bottle 100 has a capacity of, but not limited to, 20 oz. or 650 ml. In one embodiment, the infusion water bottle 100 has a leak-proof design with silicone rings. In some embodiments, the infusion water bottle 100 could be manufactured in different sizes and is dishwasher safe. The infusion water bottle 100 could be used for multi-purpose such as a juicer, fruit infuser, and water bottle that is suitable for traveling, at home and office, in the gym, and on the sports field. The infusion water bottle 100 is easy to use and designed to meet daily hydration requirements for the user 126, thereby increasing immunity against infectious diseases such as Covid-19.

Figure 3:
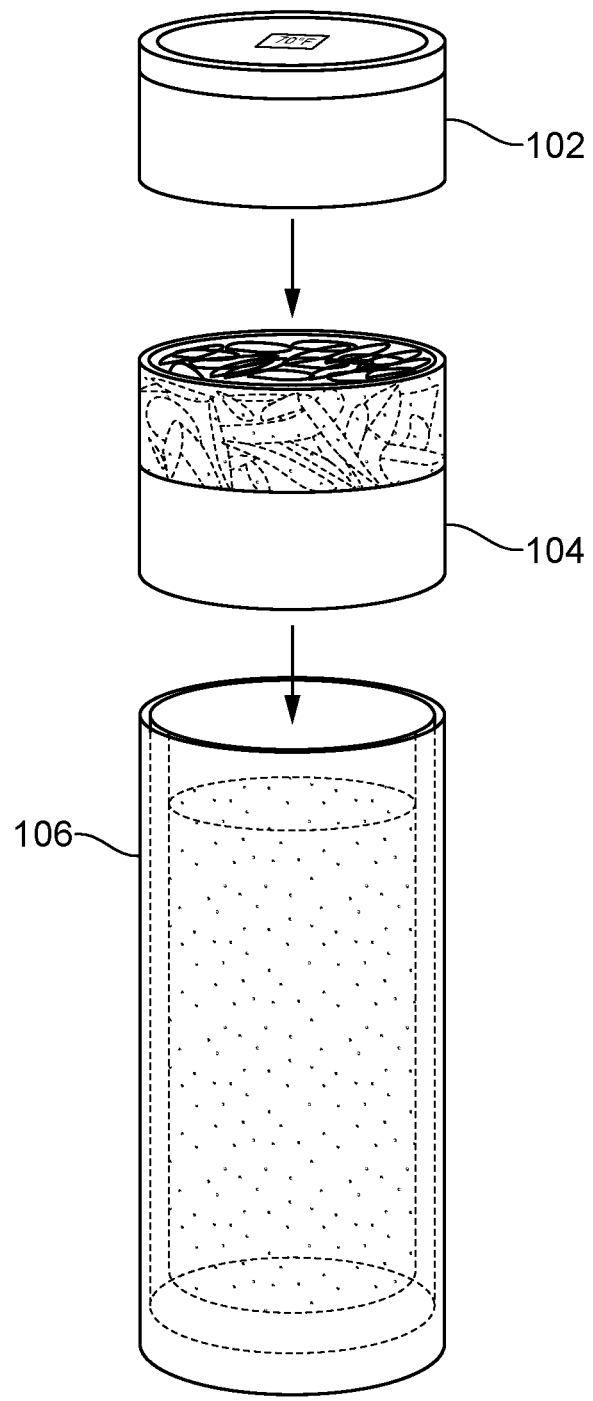
FIG. 3 illustrates an exploded view of the infusion water bottle, in accordance with an embodiment of the present disclosure.

Referring to FIG. 3, there is described an illustration of an exploded view of the infusion water bottle 100, in accordance with an embodiment of the present disclosure, wherein the infusion water bottle 100 comprises a body 124, an infusion chamber 102 and a lid 104. In accordance with an embodiment of the present disclosure, the body 124 of the infusion water bottle 100 is selected from the group comprising at least one of, but not limited transparent liquid container made of a Borosilicate glass. Furthermore, the infusion chamber 102 of the infusion water bottle 100 is selected from the group comprising at least one of, but not limited to transparent liquid container made of a Borosilicate glass. The infusion chamber 102 is configured to be removably secured to the top portion of the body 124, thereby, sealing the open end of the body 124 of the infusion water bottle 100. Further, the infusion chamber 124 receives a flavoring material, wherein the infusion chamber 102 comprises a plurality of openings at a bottom portion of the infusion chamber 102, to allow the liquid to flow in and out of the infusion chamber. The infusion water bottle 100 further comprises a lid 104 removably secured to a top portion of the infusion chamber 102, wherein the lid 104 comprises a temperature sensor, a display and a controller. In an embodiment, the temperature sensor is coupled to the infusion chamber and downwardly extending therefrom to the body. In another embodiment, the display is positioned on a surface 118 of the lid.

Figure 4:
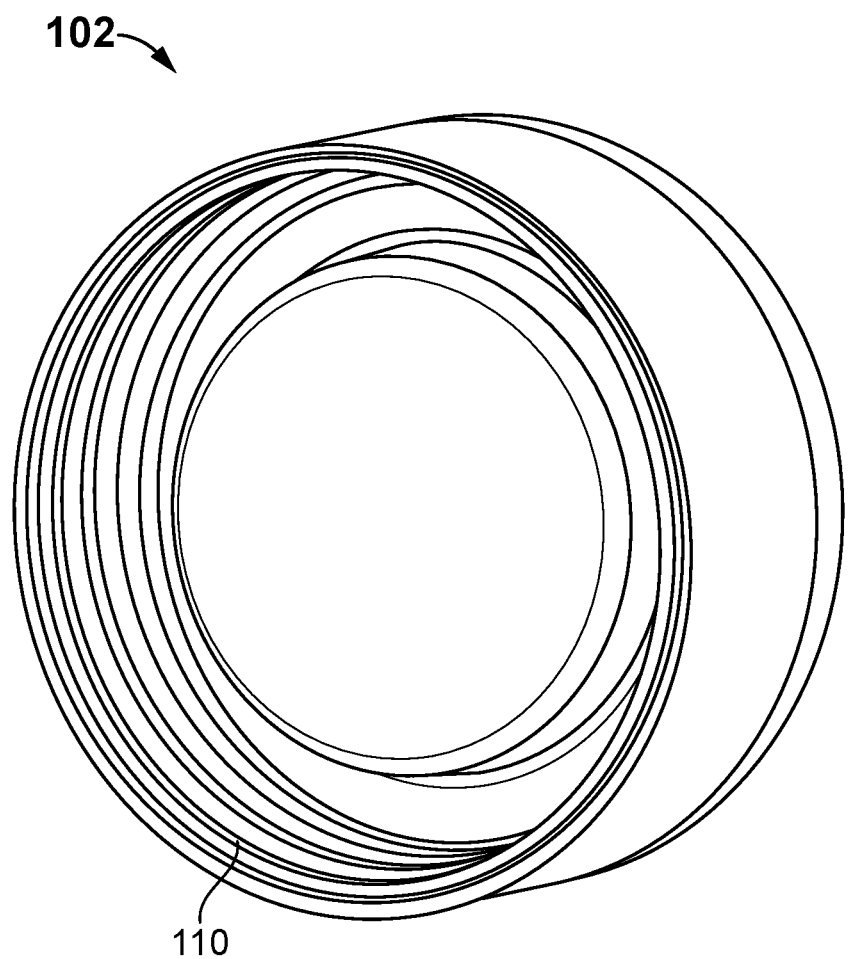
FIG. 4 illustrates a rear perspective view of an infusion chamber of the infusion water bottle, according to one embodiment of the present disclosure.
Figure 5:
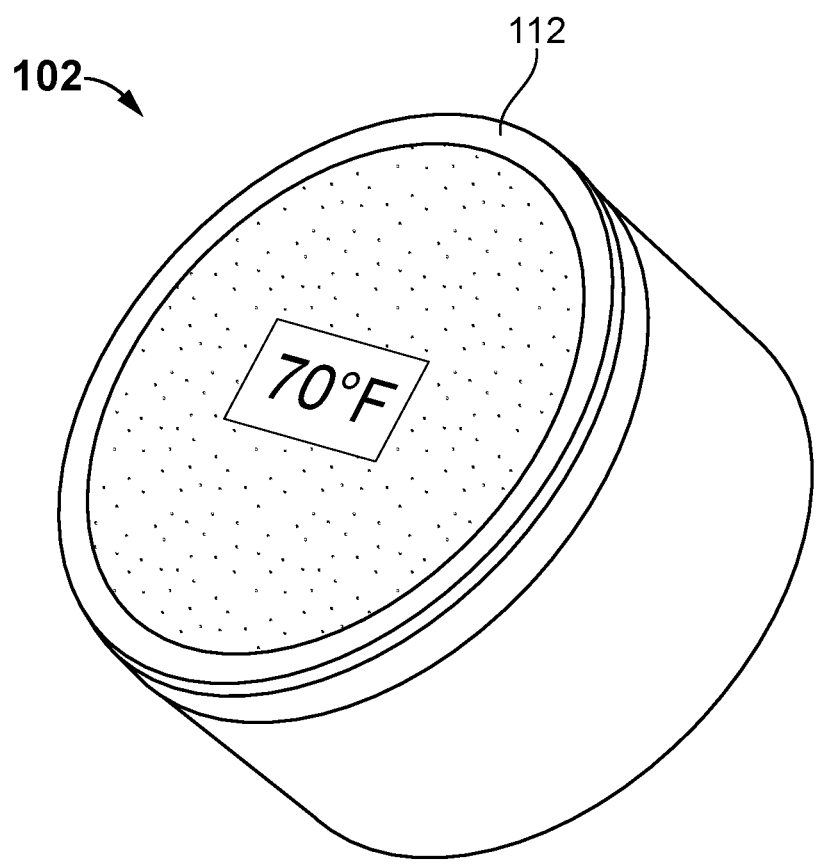
FIG. 5 illustrates a side perspective view of a lid of the infusion water bottle, according to one embodiment of the present disclosure.

Referring to FIG. 4 and FIG. 5, there is illustrated the rear perspective view and the side perspective view of the lid 104 of the infusion water bottle 100, respectively, in accordance with an embodiment of the present disclosure. The lid 104 as disclosed in the present disclosure, comprises a temperature sensor coupled to the infusion chamber 102 and downwardly extending therefrom to the body 124. In an embodiment, the body 124 of the infusion water bottle is selected from a transparent material including but not limited to Borosilicate glass. The lid further comprises a display and a controller, wherein the display is positioned on a surface 118 of the lid 104, and wherein the controller is operatively connected to the temperature sensor and the display. In accordance with the invention as defined in the present disclosure, the controller is configured to receive signals from the temperature sensor indicative of the temperature inside the infusion chamber and the body and output temperature information on the display.

In another embodiment, the lid 104 comprises a plurality of threads at the bottom portion thereof, annularly formed around an opening bottom of the lid, for threadably engaging to the top outer surface of the infusion chamber 102. In yet another embodiment, the lid 104 comprises a plurality of threads at the bottom portion 120 thereof, annularly formed around an opening bottom of the lid, for threadably engaging to the top outer surface of the body 124. In accordance with the present disclosure, the plurality of threads disposed at the bottom portion 120 of the lid are identical to the plurality of threads disposed at the bottom opening surface of the infusion chamber 102. Consequently, the lid can also be threadably secured to the body 124 of infusion water bottle 100.

In accordance with some embodiments of the present disclosure, the lid 104 comprises one or more battery cells disposed therein, wherein the one or more battery cells are operatively connected to the temperature sensor, the controller and the display. The one or more battery cells are configured to provide power to the display, the controller and the temperature sensors for their operations.

Figure 6:
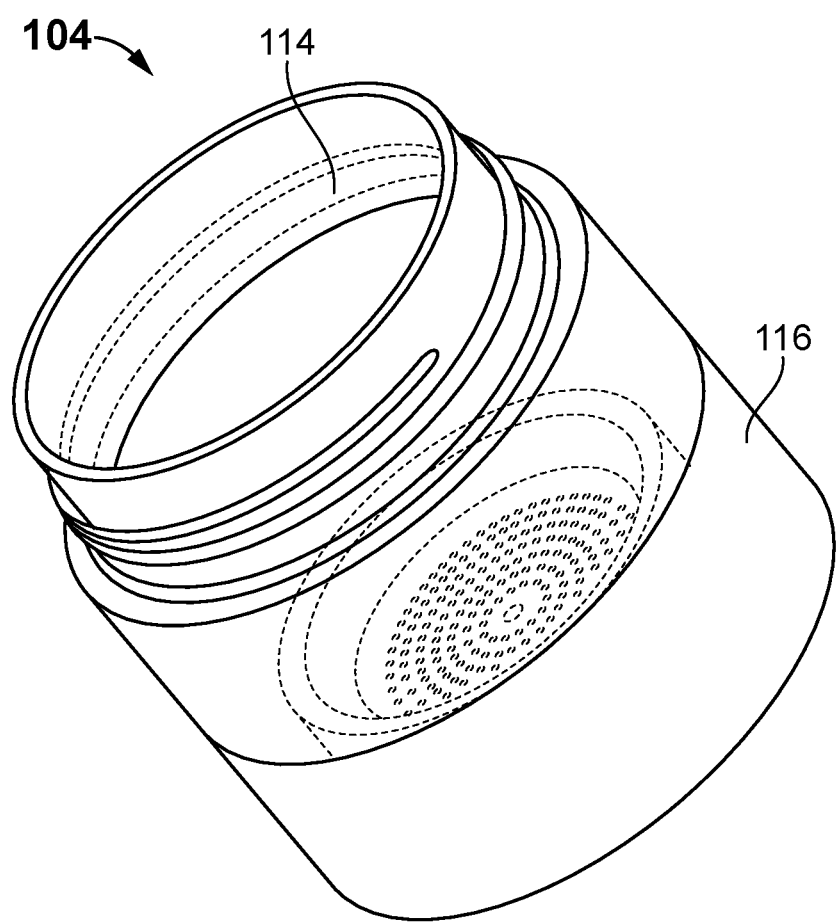
FIG. 6 illustrates a top perspective view of the body of the infusion water bottle, according to one embodiment of the present disclosure.

Referring to FIG. 6, the infusion chamber 102 of the infusion water bottle 100, according to one embodiment is disclosed. In accordance with an embodiment of the present disclosure, the infusion chamber 102 of the infusion water bottle 100 is selected from the group comprising at least one of, but not limited transparent liquid container made of a Borosilicate glass. In another embodiment, the transparent material comprises but is not limited to, Borosilicate glass. In one embodiment, the infusion chamber 102 is configured to be removably secured to the top portion of the body 124 and receives a flavoring material. In an instance, the flavoring material comprises at least one additive selected from the group including natural flavors, nature-identical flavors, artificial flavors, and pieces of fruits and vegetables. Further, the infusion chamber 102 comprises a plurality of openings at a bottom portion of the infusion chamber 102, to allow the liquid to flow in and out of the infusion chamber 102. In another embodiment of the present disclosure, the infusion chamber 102 comprises a flange removably secured to a bottom portion of the infusion chamber 102 and a plate extending towards an outer periphery of the flange, wherein the plate comprises the plurality of openings to allow the liquid to flow in and out of the infusion chamber 102. The liquid or water is made to flow between the body 124 and the infusion chamber 102 via the plate of the infusion chamber 102.

According to an embodiment, the infusion chamber 102 comprises a plurality of threads at the top portion thereof, annularly formed around an opening top 114 of the infusion chamber 102 for threadably engaging to an outer surface of the bottom portion 120 of the lid 104. In some instances, the flange is removably secured to an inner surface of the bottom portion of the infusion chamber 102, thereby securing the flange to the bottom portion of the infusion chamber 102. In another embodiment, the infusion chamber 102 comprises a plurality of threads at the bottom portion thereof, annularly formed at an inner surface of the bottom portion 116 of the infusion chamber 102, for threadably engaging to an outer surface of the top portion 122 of the body 124.

Figure 7:
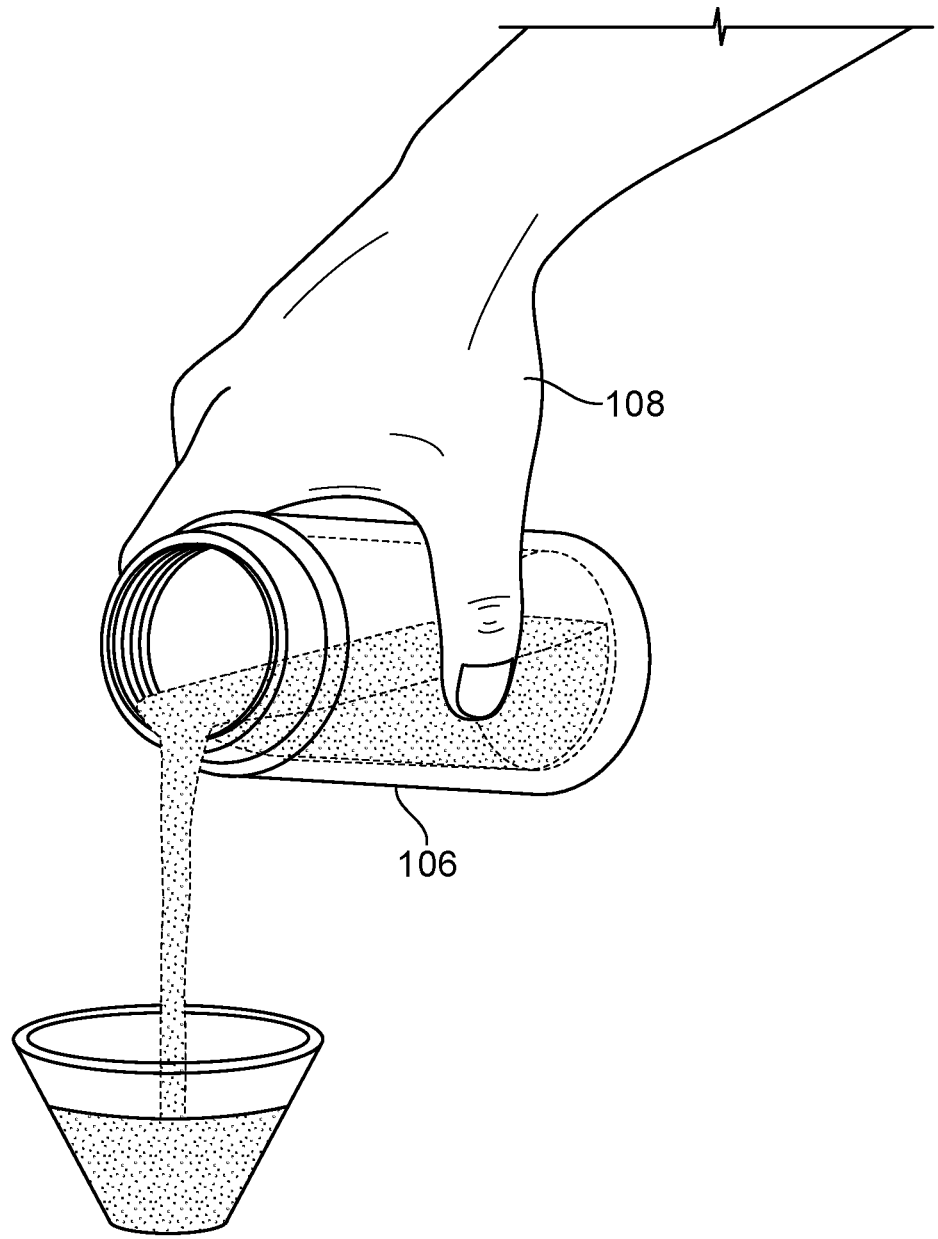
FIG. 7 provides an illustration of the infusion water bottle after being opened up from the lid, according to another embodiment of the present disclosure.

Referring to FIG. 7, there is described an illustration in which the body 124 of the infusion water bottle 100 is opened up from the lid 104. The liquid kept inside the body 124 is poured into flask in accordance with the user's 126 convenience. The user 126 can easily pour the liquid contained inside the body 124 into some flask or any other medium at the user's convenience.

Figure 8:
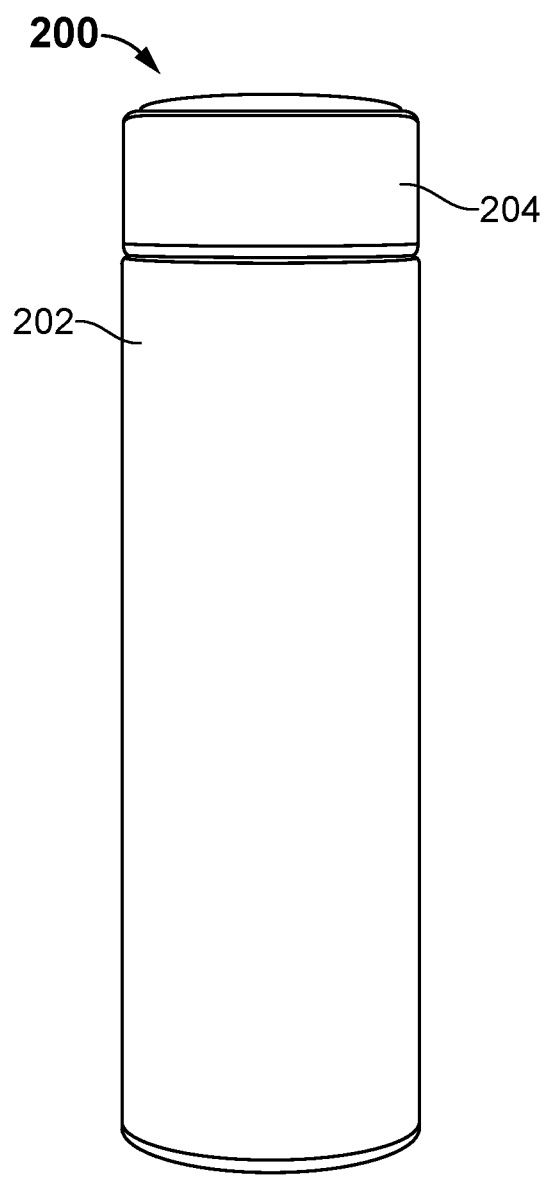
FIG. 8 illustrates a smart infusion water bottle made of stainless steel, according to another embodiment of the present disclosure.
Figure 9:
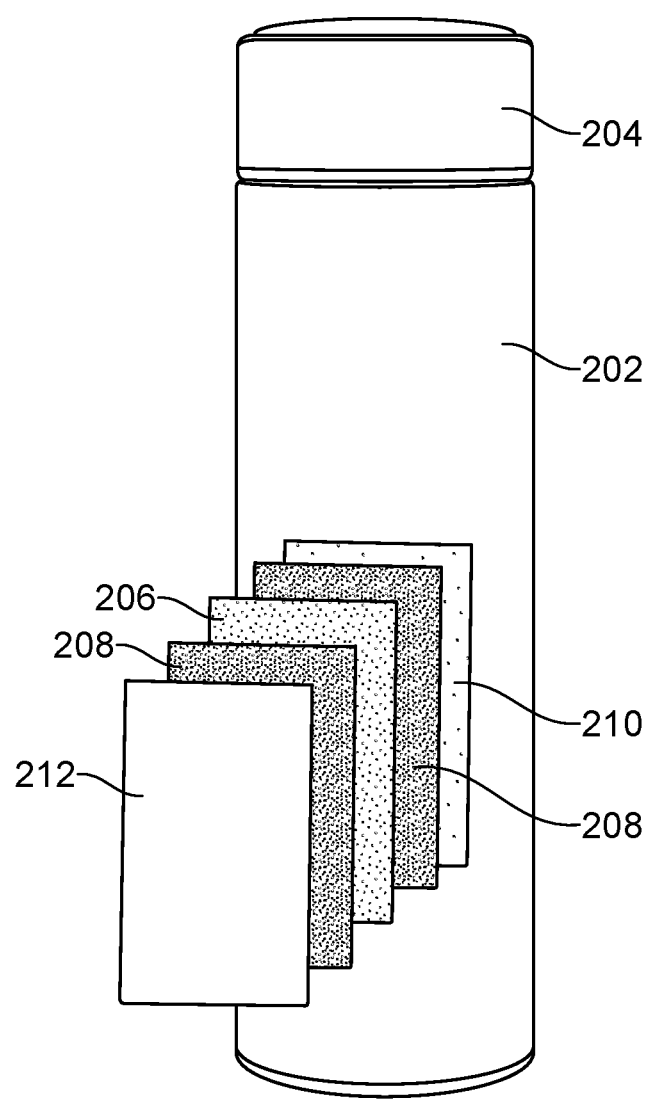
FIG. 9 illustrates a composition of materials employed in the infusion water bottle in the form of plurality of layers, according to another embodiment of the present disclosure.

Referring to FIG. 8, there is described a smart infusion water bottle 200 made of the material selected from any type of material other than a transparent material. In an instance, the infusion water bottle 200 is made of stainless steel. Furthermore, referring to FIG. 9, there is described a composition of materials employed in the infusion water bottle in the form of plurality of layers 206-212, according to one embodiment of the present disclosure. According to an embodiment, the infusion water bottle 200 is made of a plurality of layers 206-212 of materials, wherein each layer from the plurality of layers 206-212 serve a specific purpose. As shown in FIG. 9, according to an embodiment, the infusion water bottle is made of a food grade 304 stainless steel 208, wherein the food grade 304 stainless steel 208 is configured to be BPA free and highly resistant to rust. In another embodiment, the infusion water bottle 200 is simply made of a steel. Consequently, the infusion water bottle 200 is easy to clean. In a particular embodiment, the infusion water bottle 200 is made of a double walled steel 208-208 enclosing a vacuum 206 therebetween. The layer 206 is void of any matter, therefore there exists no means or medium for transferring of heat. Consequently, the temperature of liquid inside the infusion water bottle 200 is maintained at a certain level. Furthermore, in another embodiment, since the body 224 of the infusion water 200 is made from the material layer 210 that is sweat and burn free, the hot liquid will not impact the body's 224 exterior surface, hence there occurs no condensation on the infusion water bottle 200. Therefore, the disclosed infusion water bottle 200 is easy to hold. In another embodiment, the outermost layer 212 is the surface treated layer. Herein, the surface of the outermost layer 212 is treated with an environmentally friendly paint, that is not easy to be scratched. Furthermore, due to the surface treated layer 212, the logo or design on the surface of the infusion water bottle 200 remains intact.

According to an embodiment, the infusion water bottle 200 comprises a body 224 and a lid 204, wherein the body 224 of the infusion water bottle 200 can easily be assembled or disassembled with the lid 204 of the infusion water bottle 200. In this embodiment, the body 224 comprises a plurality of threads at the top portion thereof, annularly formed around an opening top of the body. On the other side, the lid 204 comprises a plurality of threads at the bottom portion 220 thereof, annularly formed around an opening bottom of the lid 204, thereby enabling the lid 204 to threadably engage to an outer portion of the body.

According to another embodiment, the infusion water bottle 200 comprises a body 224, a lid 204 and a filter 222, wherein the body 224 of the infusion water bottle 200 can easily be assembled or disassembled with the lid 204 of the infusion water bottle 200. The filter 222 of the infusion water bottle 200 may act as the infusion chamber as described in previous embodiments of the present disclosure. The filter 222 fits inside the infusion water bottle 200 at an intermediate position of the body 224 of the infusion water bottle 200. In another embodiment, the filter 222 is configured to fit at a top position 232 of the body 224 via threadable coupling. The filter 222 is configured to fit at an intermediate position of the body 224, therefore two chambers are formed inside the body 224 as a result of configuration of the filter 222, first is the infusion chamber above the filter 222 and second is the liquid chamber below the filer 222. Further, the infusion chamber receives a flavoring material, and the filter 222 comprises a plurality of openings to allow the liquid to flow in and out of the infusion chamber 102. In another embodiment, the infusion chamber is configured to receive the flavoring material that gets infused with the liquid inside the liquid chamber, once the infusion water bottle is tilted to a certain extent. Consequently, the flavors from the flavoring material are infused into the liquid stored in the infusion water bottle 100. In this embodiment, the body 224 comprises a plurality of threads at the top portion thereof, annularly formed around an opening top of the body. On the other side, the lid 204 comprises a plurality of threads at the bottom portion 220 thereof, annularly formed around an opening bottom of the lid 204, thereby enabling the lid 204 to threadably engage to an outer portion of the body.

According to another embodiment of the present disclosure, the lid 204 comprises a temperature sensor, a display positioned on a surface 218 thereof and a controller, wherein the controller is operatively coupled with the display and the temperature sensor. The temperature sensor is coupled to the body 224 and is configured to determine the temperature of the liquid stored inside the body 224. The controller is configured to receive signals from the temperature sensor indicative of the temperature inside the body and output the temperature information of the liquid inside the body, to the display.

Figure 10:
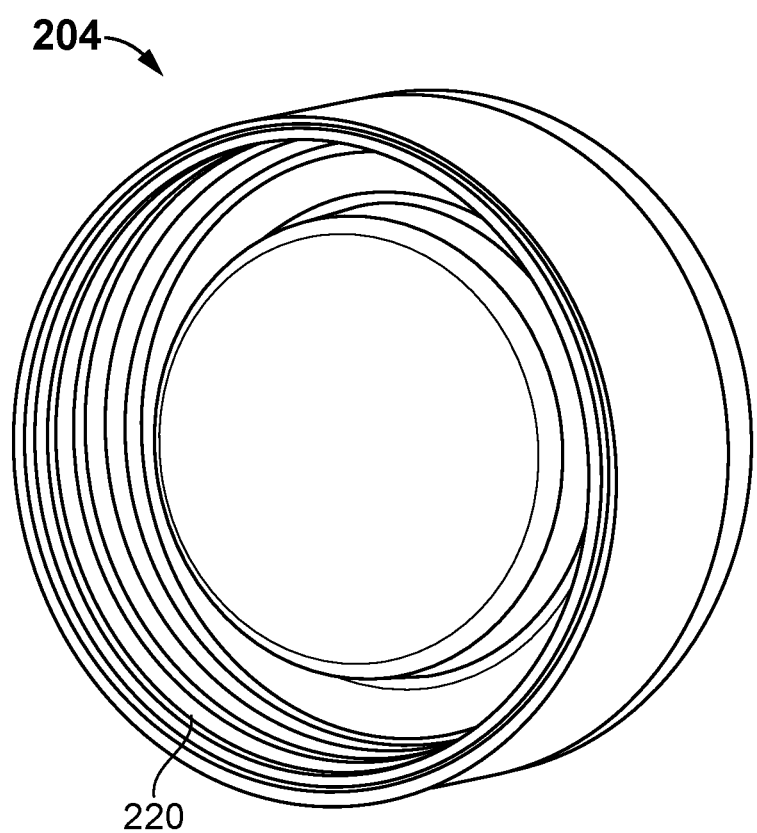
FIG. 10 illustrates a rear perspective view of the lid of the infusion water bottle, according to another embodiment of the present disclosure.
Figure 11:
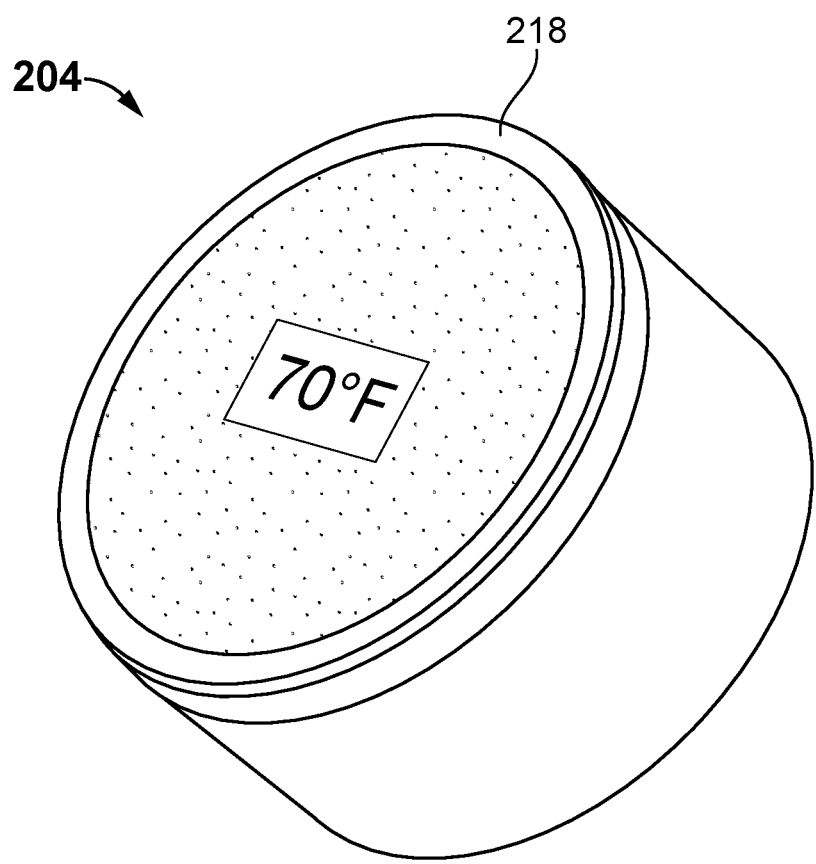
FIG. 11 illustrates a top perspective view of the body of the infusion water bottle, according to another embodiment of the present disclosure.

Referring to FIG. 10 and FIG. 11, there is provided the rear perspective view and the side perspective view of the lid 204 of the infusion water bottle 200, in accordance with an embodiment of the present disclosure. In this embodiment, the body 224 and the infusion chamber 202 of the infusion water bottle 200 is selected from the material not limited to stainless steel. The lid 204 as disclosed in the present disclosure, comprises a temperature sensor coupled to the infusion chamber 202 and downwardly extending therefrom to the body 224. The lid 204 further comprises a display and a controller, wherein the display is positioned on a surface 218 of the lid 204, and wherein the controller operatively connected to the temperature sensor and the display. In accordance with the invention as defined in the present disclosure, the controller is configured to receive signals from the temperature sensor indicative of the temperature inside the infusion chamber 202 and the body 224 and output temperature information on the display. In a particular embodiment, the display is positioned on a top surface of the lid 204, and is configured to output temperature readings in all scales, such as but not limited to Celsius and Fahrenheit.

In another embodiment, the lid 204 comprises a plurality of threads at the bottom portion thereof, annularly formed around an opening bottom of the lid 204, for threadably engaging to the top outer surface of the infusion chamber 202. In yet another embodiment, the lid 204 comprises a plurality of threads at the bottom portion 220 thereof, annularly formed around an opening bottom of the lid 204, for threadably engaging to the top outer surface of the body 224. In accordance with the present disclosure, the plurality of threads disposed at the bottom portion 220 of the lid 204 are identical to the plurality of threads disposed at the bottom opening surface of the infusion chamber 202. Consequently, the lid can also be threadably secured to the body 224 of infusion water bottle 200.

In accordance with some embodiments of the present disclosure, the lid 204 comprises one or more battery cells disposed therein, wherein the one or more battery cells are operatively connected to the temperature sensor, the controller and the display. The one or more battery cells are configured to provide power to the display, the controller and the temperature sensors for their operations.

Figure 12:
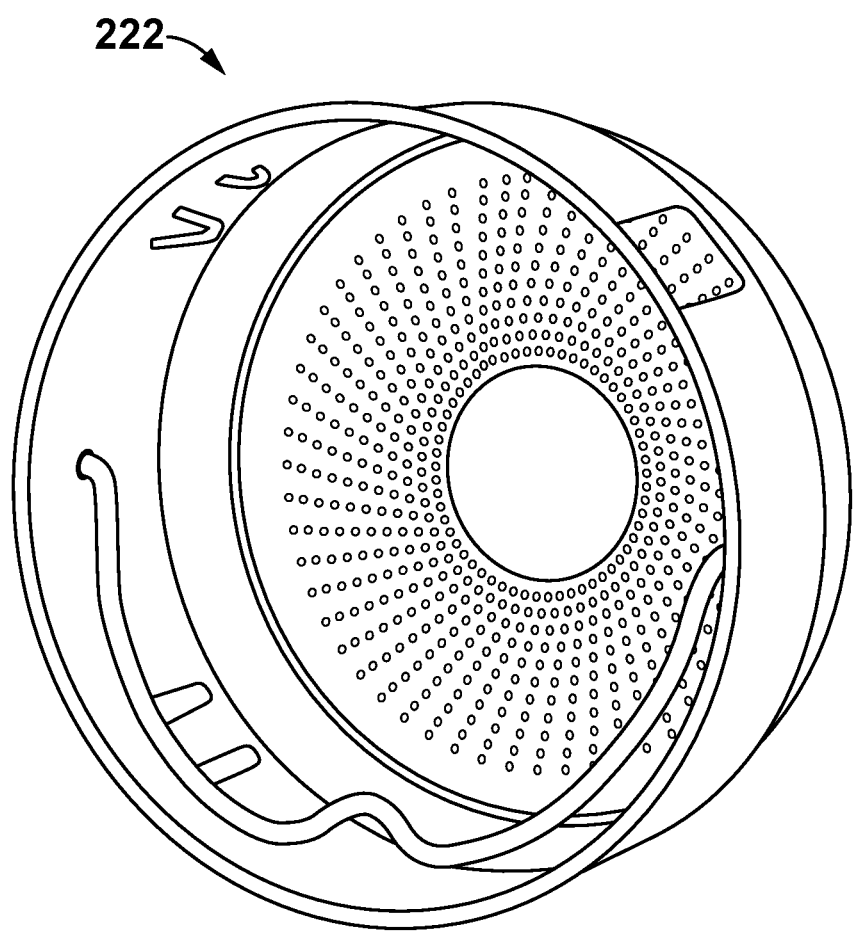
FIG. 12 illustrates an illustration of the filter, in accordance with another embodiment of the present disclosure.

Referring to FIG. 12, there is provided an illustration of the filter 222 in accordance with an embodiment of the present disclosure. The filter 222 of the infusion water bottle 200 may act as the infusion chamber 202 as described in previous embodiments of the present disclosure. The filter 222 fits inside the infusion water bottle 200 at an intermediate position of the body 224 of the infusion water bottle 200. In another embodiment, the filter 222 is configured to fit at the top position 232 of the body 224 via threadable coupling. The filter 222 is configured to fit at an intermediate position of the body 224, therefore two chambers are formed inside the body 224 as a result of configuration of the filter 222, first is the infusion chamber 202 above the filter 222 and second is the liquid chamber below the filer 222. Further, the infusion chamber 202 receives a flavoring material, and the filter 222 comprises a plurality of openings to allow the liquid to flow in and out of the infusion chamber 202. In another embodiment, the infusion chamber 202 is configured to receive the flavoring material that gets infused with the liquid inside the liquid chamber, once the infusion water bottle 200 is tilted. Consequently, the flavors from the flavoring material are infused into the liquid stored in the infusion water bottle 200.

Figure 13:
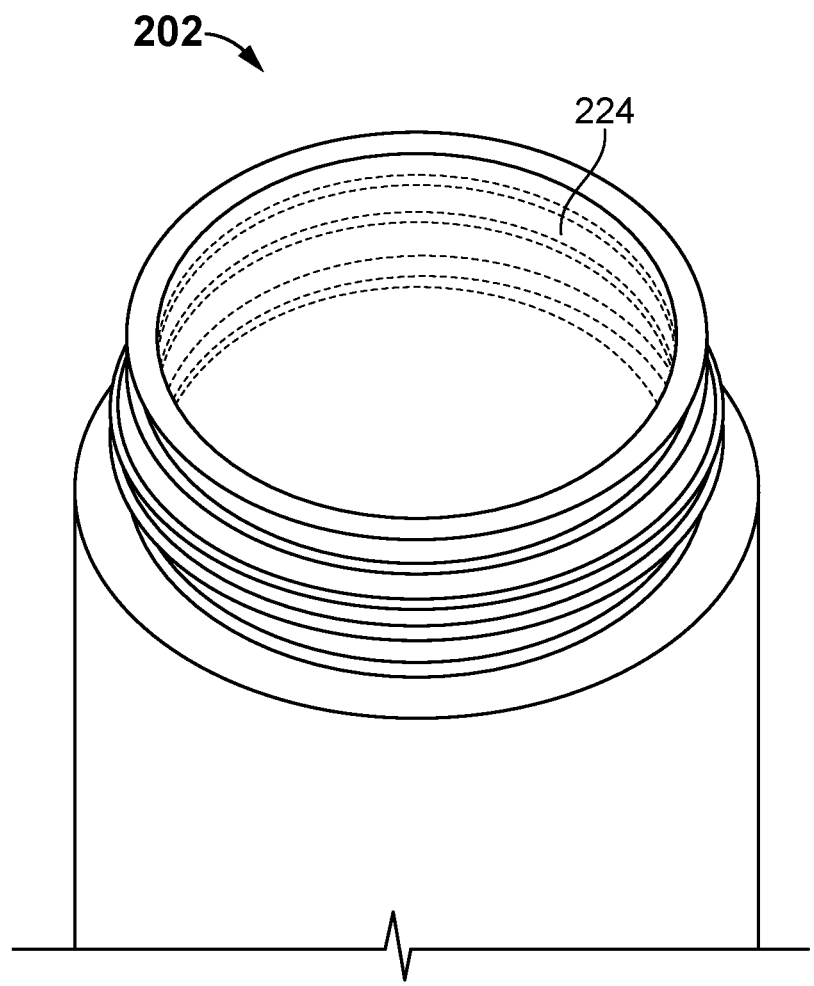
FIG. 13 provides an illustration of the body, in accordance with another embodiment of the present disclosure.

Referring to FIG. 13, there is provided an illustration of the body 224, in accordance with an embodiment of the present disclosure. The body comprises an open end at a top portion for allowing a liquid to flow in and out therethrough. In an embodiment, the body 224 is made of a material comprising stainless steel. Optionally, the body is made of a double-walled steel enclosing a vacuum therebetween. In another embodiment, the body 224 of the infusion water bottle 200 is made of food grade 304 stainless steel, wherein the food grade 304 stainless steel is BPA free and highly resistant to dust. Consequently, the infusion water bottle is easy to clean. Furthermore, in another embodiment, since the body 224 of the infusion water 200 is sweat and burn free, the hot liquid will not impact the body's exterior surface, hence there occurs no condensation on the infusion water bottle 200, making the infusion water bottle 200 easy to hold.

Figure 14:
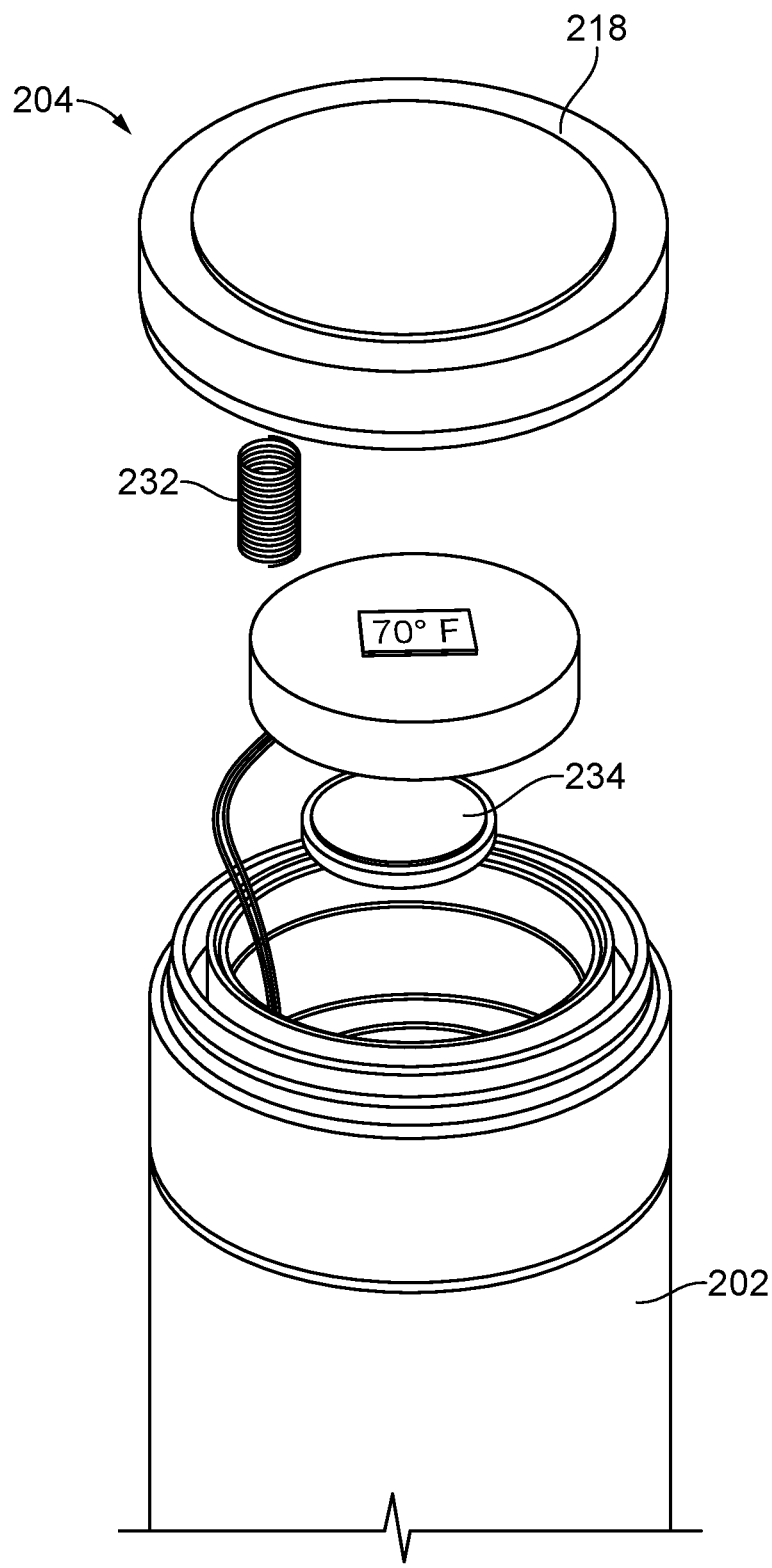
FIG. 14 illustrates an exploded view of the lid of the infusion water bottle, in accordance with another embodiment of the present disclosure.

Referring to FIG. 14, there is provided an illustration of the exploded view of the lid 204 of the infusion water bottle 200, in accordance with an embodiment of the present disclosure. The infusion water bottle 200 further comprises a lid removably secured to a top portion of the infusion chamber, wherein the lid comprises a temperature sensor 234 coupled to the infusion chamber and downwardly extending therefrom to the body, a display positioned on a surface 218 of the lid and a controller operatively connected to the temperature sensor and the display, wherein the controller is configured to receive signals from the temperature sensor indicative of the temperature inside the infusion chamber and the body and output temperature information on the display. The temperature sensor 234 and the controller receives power input from one or more battery cell 234 in accordance with another embodiment. A spring 242 is thereby provided between the surface 218 and the display of the lid, wherein a user may obtain or determine the temperature of the liquid kept inside the infusion chamber and the body when the surface 218 of the is pushed inside that results in compression of the spring 242 connected to the display and the LED inside the display gets illuminated that provides the temperature of the liquid stored inside the body.

It is to be understood that not necessarily all objectives or advantages may be achieved in accordance with any particular embodiment described herein. Thus, for example, those skilled in the art will appreciate that certain embodiments may be configured to operate in a manner that achieves or optimizes one advantage or group of advantages as taught herein without necessarily achieving other objects or advantages as may be taught or suggested herein.

Many other variations other than those described herein will be apparent from this disclosure. For example, depending on the embodiment, certain actions, events, or functions of any of the algorithms described herein may be performed in different sequences, and may be added, merged, or excluded altogether (e.g., not all described actions or events are required to execute the algorithm). Moreover, in certain embodiments, operations or events are performed in parallel, for example, through multithreading, interrupt handling, or through multiple processors or processor cores, or on other parallel architectures, rather than sequentially. In addition, different tasks or processes can be performed by different machines and/or computing systems that can work together.

Unless otherwise stated, conditional languages such as "can," "could," "will," "might," or "may" are understood within the context as used in general to convey that certain embodiments include, while other embodiments do not include, certain features, elements, and/or steps. Thus, such conditional languages are not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under" are defined with respect to the horizontal plane.

As used herein, the terms "engaged," "connected," "coupled," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A smart infusion water bottle, comprising:
   a body comprising an open end at a top portion for allowing a liquid to flow in and out therethrough;
   an infusion chamber configured to be removably secured to the top portion of the body, receives a flavoring material, wherein the infusion chamber comprises a plurality of openings at a bottom portion of the infusion chamber, to allow the liquid to flow in and out of the infusion chamber;

a lid removably secured to a top portion of the infusion chamber, wherein the lid comprises:
   a temperature sensor coupled to the infusion chamber and downwardly extending therefrom to the body;
   a display positioned on a surface of the lid; and
   a controller operatively connected to the temperature sensor and the display, wherein the controller is configured to receive signals from the temperature sensor indicative of the temperature inside the infusion chamber and the body, and output temperature information on the display.

2. The infusion water bottle of claim 1, wherein the infusion chamber comprises a plurality of threads at the top portion thereof, annularly formed around an opening top of the infusion chamber for threadably engaging to an outer surface of a bottom portion of the lid.

3. The infusion water bottle of claim 1, wherein the infusion chamber comprises a plurality of threads at the bottom portion thereof, annularly formed around an opening bottom of the infusion chamber, for threadably engaging to an outer surface of the top portion of the body.

4. The infusion water bottle of claim 1, wherein the infusion chamber comprises:
   a flange removably secured to the bottom portion of the infusion chamber; and
   a plate extending towards an outer periphery of the flange, wherein the plate comprises the plurality of openings to allow the liquid to flow in and out of the infusion chamber.

5. The infusion water bottle of claim 4, wherein the flange is removably secured to an inner surface of the bottom portion of the infusion chamber, thereby securing the flange to the bottom portion of the infusion chamber.

6. The infusion water bottle of claim 1, is made of a double-walled steel enclosing a vacuum therebetween.

7. The infusion water bottle of claim 1, is made of a Borosilicate glass.

8. The infusion water bottle of claim 1, is made of a material comprising at least one of a Borosilicate glass and stainless steel.

9. The infusion water bottle of claim 1, wherein the flavoring material comprises at least one additive selected from the group including natural flavors, nature-identical flavors, artificial flavors, and pieces of fruits and vegetables.

10. The infusion water bottle of claim 1, wherein the lid comprises one or more battery cells disposed therein, wherein the one or more battery cells are operatively connected to the temperature sensor, the controller and the display.

11. The smart infusion water bottle of claim 1, wherein the display comprising a touch-screen display, is activated upon the physical contact of a user with the display.

12. A smart infusion water bottle, comprising:
   a body comprising an open end at a top portion for allowing a liquid to flow in and out therethrough;
   an infusion chamber configured to be removably secured to the top portion of the body, receives a flavoring material, wherein the infusion chamber comprises:
      a plate secured to a bottom portion of the infusion chamber, is configured to be extended towards an outer periphery of the infusion chamber, wherein the plate comprises a plurality of openings to allow the liquid to flow in and out of the infusion chamber;
   a lid removably secured to a top portion of the infusion chamber, wherein the lid comprises:
      a temperature sensor coupled to the infusion chamber and downwardly extending therefrom to the body;
      a display positioned on a surface of the lid; and
      a controller operatively connected to the temperature sensor and the display, wherein the controller is configured to receive signals from the temperature sensor indicative of the temperature inside the infusion chamber and the body, and output temperature information on the display.

13. The infusion water bottle of claim 12, wherein the infusion chamber comprises a plurality of threads at the top portion thereof, annularly formed around an opening top of the infusion chamber for threadably engaging to an outer surface of a bottom portion of the lid.

14. The infusion water bottle of claim 12, wherein the infusion chamber comprises a plurality of threads at the bottom portion thereof, annularly formed around an opening bottom of the infusion chamber, for threadably engaging to an outer surface of the top portion of the body.

15. The infusion water bottle of claim 12, is made of a double-walled steel enclosing a vacuum therebetween.

16. The infusion water bottle of claim 12, is made of a Borosilicate glass.

17. The infusion water bottle of claim 12, is made of a material comprising at least one of a Borosilicate glass and stainless steel.

18. The infusion water bottle of claim 12, wherein the flavoring material comprises at least one additive selected from the group including natural flavors, nature-identical flavors, artificial flavors, and pieces of fruits and vegetables.

19. The infusion water bottle of claim 12, wherein the lid comprises one or more battery cells disposed therein, wherein the one or more battery cells are operatively connected to the temperature sensor, the controller and the display.

20. The infusion water bottle of claim 12, wherein the display comprising a touch-screen display, is activated upon a physical contact of a user with the display.

21. A smart infusion water bottle, comprising:
   a body comprising an open end at a top portion for allowing a liquid to flow in and out therethrough;
   an infusion chamber configured to be removably secured to the top portion of the body, receives a flavoring material, wherein the infusion chamber comprises a plurality of openings at a bottom portion of the infusion chamber, to allow the liquid to flow in and out of the infusion chamber;
   a lid removably secured to a top portion of the infusion chamber, wherein the lid comprises
      a temperature sensor coupled to the infusion chamber and downwardly extending therefrom to the body;
      a display positioned on a surface of the lid, wherein the display indicates output information indicative of the temperature inside the infusion chamber and the body over the screen thereof.

22. The infusion water bottle of claim 21, wherein the infusion chamber comprises:
   a flange removably secured to an inner surface of the bottom portion of the infusion chamber; and
   a plate extending towards an outer periphery of the flange, wherein the plate comprises the plurality of openings to allow the liquid to flow in and out of the infusion chamber.

* * * * *